United States Patent [19]

Rose

[11] 3,739,524
[45] June 19, 1973

[54] PLANT-HOLDING RECEPTACLES

[76] Inventor: Harry J. Rose, 12247 N. Fairview Avenue, Milwaukee, Wis. 53213

[22] Filed: June 23, 1971

[21] Appl. No.: 155,776

[52] U.S. Cl. .................................. 47/38.1, 116/118
[51] Int. Cl. ............................................. A01g 27/00
[58] Field of Search ...................... 47/38, 38.1, 55, 47/27; 116/118

[56] References Cited

UNITED STATES PATENTS

| 1,646,317 | 10/1927 | Rein .................................. 116/118 R |
| 1,447,824 | 3/1923 | Thompson ...................... 116/118 R |
| 2,695,474 | 11/1954 | Barstow .............................. 47/38.1 |
| 1,218,228 | 3/1917 | Tillmann ............................ 47/38.1 |
| 2,562,604 | 7/1951 | Couchey ..................... 116/118 R X |
| 1,778,840 | 10/1930 | Wale ................................. 116/118 R |
| 3,136,295 | 6/1964 | Gramo ............................. 116/118 R |
| 1,551,744 | 9/1925 | Hull ................................. 116/118 R |

FOREIGN PATENTS OR APPLICATIONS

| 1,098,155 | 1/1968 | Great Britain ....................... 47/38.1 |
| 936,635 | 11/1955 | Germany ................................. 47/38 |
| 249,444 | 1/1966 | Austria ................................... 47/38 |
| 289,885 | 10/1965 | Australia ............................... 47/38.1 |
| 1,395,186 | 3/1965 | France ................................. 47/38.1 |
| 80,172 | 7/1894 | Germany ................................. 47/38 |

OTHER PUBLICATIONS

Reproduction of Reference "O"

Primary Examiner—Robert E. Pulfrey
Assistant Examiner—Eugene H. Hickholt
Attorney—Arthur L. Morsell, Jr. and Curtis B. Morsell

[57] ABSTRACT

A plant container having a false bottom forming a water-containing compartment therebelow, the upper portion of said container being adapted to have a plant or flower planted therein, there being a wick projecting upwardly through said false bottom to automatically introduce water into said container upper portion by capillary action, and there being a channel member extending upwardly from said false bottom adjacent the container inner wall permitting water to be poured directly into said lower water-containing compartment, said upright channel member having a vertically-movable rod projecting therefrom with a float element on its lower end within said water compartment, said rod visually indicating when water should be added to said container.

3 Claims, 3 Drawing Figures

PATENTED JUN 19 1973
3,739,524
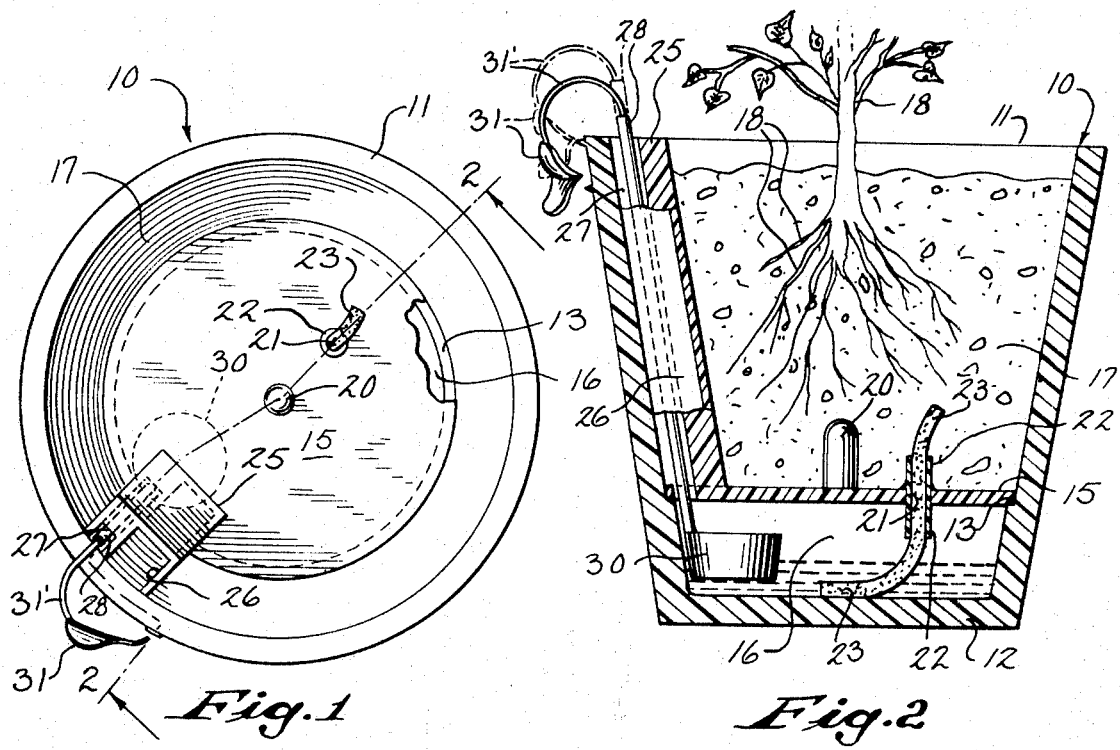
Fig.1
Fig.2
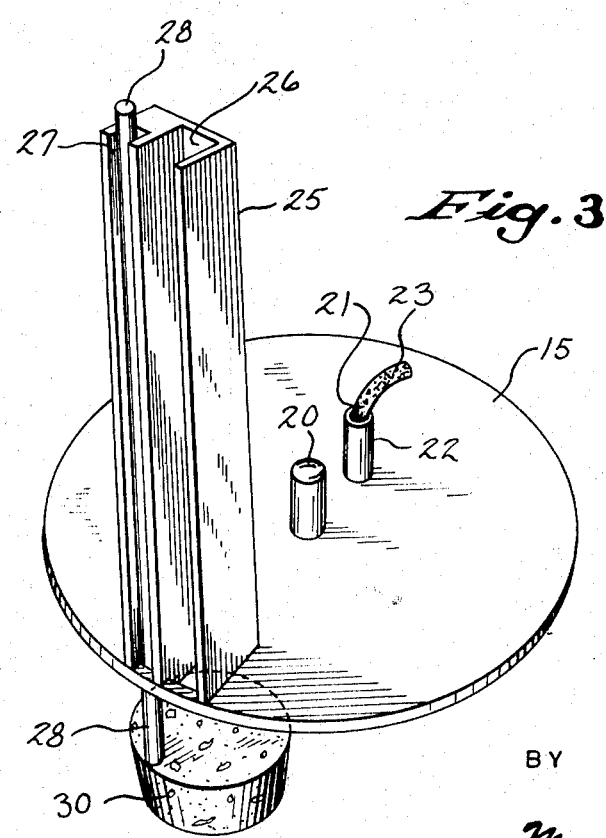
Fig.3
INVENTOR
HARRY J. ROSE
BY
Morell & Morell
ATTORNEYS

PLANT-HOLDING RECEPTACLES

BACKGROUND OF THE INVENTION

1. Field of the Invention

The present invention relates to pots and receptacles within which plants and flowers are grown, and more particularly to a novel and improved plant container having a number of advantages over conventional flower pots and other receptacles intended for the same general purpose.

2. Description of the Prior Art

Conventional flower pots and plant containers ordinarily comprise a plain cylindrical or tapered receptacle filled with earth and having a plant or flower planted therein. A small hole is provided in the bottom of such conventional containers, and when it is desired to water the plant the water is merely introduced into the top of the receptacle until it is estimated that a sufficient quantity has been poured therein. A portion of the water seeps through the dirt and escapes through said hole in the container bottom, which necessitates that the pot be contained in a dish or pan in order to prevent said water from running out and marring the finish of the table or the like on which said pot is placed. Moreover, with such conventional plant containers it is impossible to determine how fast and to what extent the water is absorbed by the dirt during the watering process. The result is that the container is frequently inadvertently filled to the point where said water overflows the container and spills on the table or the like, which is annoying and an inconvenience to clean up, as well as being damaging to the table.

A further disadvantage of conventional plant receptacles is that there is no reliable way of determining when the plant is in need of additional water, other than by feeling the dirt, which is an uncertain and unreliable procedure at best.

In order to overcome the possibility of the container overflowing when the plant is being watered, as well as to provide continuous introduction of water to the container, plant receptacles have been designed in the past utilizing a felt wick or the like to continuously automatically convey water to the container from a separate water source by capillary action, but such devices are relatively complex, expensive, and troublesome, and have proven impractical and commercially unsuccessful.

As far as applicant is aware no one has heretofore designed a capillary action-type plant receptacle of the simple yet effective type hereinafter described. Nor has anyone previously incorporated means in such a plant receptacle adapted to provide a visual indication of the water content of the receptacle at all times, thereby clearly revealing when water should be added to ensure the proper growth and health of the plant.

SUMMARY OF THE INVENTION

The present invention comprises a plant receptacle having an upper, plant-containing section with a false bottom providing a separate water compartment therebelow, there being a wick projecting upwardly into said plant section from said water-containing compartment to continuously supply water to the plant by capillary action. Further, said receptacle is provided with an integral upright, tube-like channel member through which water can be introduced directly into said water compartment without spillage or overflowing, and, in addition, said channel member may, in the preferred embodiment, have an elongated, vertically-movable rod carried therein provided with indicator means on its upper, projecting end and a float element on its lower end positioned in said water compartment, said rod being designed to rise and fall with the level of the water to provide a visual index at all times of the volume of water in said compartment.

A further object of the invention is to provide a new and improved plant receptacle, as described, which receptacle does not have a hole in the bottom thereof through which water can escape, as in conventional plant containers, thereby preventing the water from draining out onto the table, and eliminating the necessity for placing said receptacle in a dish or the like.

A further object of the present invention is to provide a mew [nd improved plant-containing receptacle which can be molded of plastic or similar attractive, durable, and relatively inexpensive material.

BRIEF DESCRIPTION OF THE DRAWING

In the accompanying drawings, wherein there is illustrated one preferred form of the present invention, and wherein the same reference numerals designate the same parts in all of the views:

FIG. 1 is a top plan view of the new plant-holding receptacle comprising the invention;

FIG. 2 is a vertical sectional view through said receptacle, taken along line 2—2 of FIG. 1; and FIG. 3 is a perspective view of the false bottom and attached combination watering and gauge channel unit featured in the invention.

DESCRIPTION OF THE PREFERRED EMBODIMENT

Referring now more particularly to the drawings, the numeral 10 designates the outer shell or housing featured in the present invention. The illustrated housing 10 is generally cylindrical in form, having a top 11 and bottom 12 and being tapered downwardly somewhat toward the bottom thereof. It is to be understood, however, that the exact shape of said outer container, as well as the size thereof, is not critical and the invention is not to be limited or confined in this respect. Similarly, while it has been found practical and economical to mold said housing of expanded acrylic butyl styrene with non-porous surfaces, other comparable plastics or low-cost materials could be utilized and the invention is not to be limited in this respect.

As will be seen in FIG. 2, formed on the inner surface of said housing 10, spaced above the bottom 12 thereof, is an annular ridge or shoulder 13, and removably seated thereon is a disc-like element 15 forming a false bottom. The space between said false bottom 15 and the bottom 12 of the housing provides a water-containing compartment 16, as will be hereinafter described in greater detail, and the area 17 of the container above said false bottom member may be filled with earth and have a plant or flower planted therein, such as the plant 18 illustrated in FIG. 2.

The false bottom member 15 is preferably provided with a small upright knob 20 in the center thereof to facilitate the manual insertion and withdrawal of said member, and formed in said false bottom is an aperture 21 having a surrounding collar 22. As will be seen, projecting through said aperture 21 and collar 22 is a wick 23 which extends from the bottom of the lower, water-containing compartment 16 upwardly into the earth-filled main compartment 17 thereabove. Said wick is preferably formed of felt or similar material capable of conveying water by capillary action, but the exact composition of said material may be varied as desired.

With reference now more particularly to FIG. 3 of the drawings, attached to said disc-like false bottom member 15 adjacent the periphery thereof is an upright hollow unit 25 of rectangular cross section including a main, water-receiving channel 26 which is of sufficient size to permit water to be poured into the top thereof by means of a funnel or a pitcher having a small spout, and a smaller, adjacent channel 27 in which there is carried an elongated rod 28. The open, upper end of said channel unit lies flush with the top of the receptacle 10, and said rod 28 projects somewhat above said receptacle, with the lower end of said rod extending downwardly into the water-containing compartment 16 as shown in FIG. 2. A cork or comparable float element 30 is mounted on the lower end of said rod and is designed to ride up and down with the level of the water in said compartment 16, as will be more fully described hereinafter. In the preferred embodiment of the present invention, and referring now to FIGS. 1 and 2, some form of indicator device, such as the illustrated ornamental plastic petal 31 and stem 31' is carried on the upper, projecting end of said rod 28. Again, the exact nature and design of said indicator element 31, 31' can be varied as desired and the invention is by no means to be limited in this respect.

It will be seen that in the illustrated form of the present invention said rectangular, combination pouring and gauge channel 25 is open along one of its longitudinal sides, and when the false bottom member 15 and attached channel unit 25 is inserted into the housing 10 said channel open side abuts the housing inner wall to provide an enclosed tube through which water can be poured into the lower, water-containing compartment 16. Preferably said channel member is formed of a clear material such as styrene or lucite, and may be molded integrally with the disc 15. In the illustrated embodiment of the invention said upright channel unit is formed at an angle from the vertical to conform to the inclined wall of the housing, while in a perfectly cylindrical pot said channel unit would, of course, be vertically disposed.

In the use of the present invention the disc-like false bottom member 15 is inserted into the housing 10, with the cork float 30 positioned within the compartment 16 formed between said disc member and the bottom 12 of the container, and with the wick 23 projecting upwardly into the container section 17. As mentioned, the upright knob 20 facilitates the insertion of said disc member 15, and said disc is designed to rest on the annular shoulder 13 formed on the inner surface of the housing wall.

With the false bottom member 15 and attached channel unit 25 inserted in the receptacle as described, the upper container section 17 may be filled with dirt and a plant or flower planted therein in the usual manner. A pouring spout or funnel may then be utilized to introduce water through the upper end of the channel portion 26 into the lower, water-containing compartment 16, and this is an important feature of the invention, regardless of whether the indicator gauge feature is used.

As water is poured into the compartment 16 the water level therein rises, and in the preferred embodiment, when the level indicator is used, as said water level rises the cork float 30 ascends therewith. The result is that the vertically-movable rod 28 shifts upwardly with said rising water level until said rod reaches the fully elevated broken-line position shown in FIG. 2. When said rod reaches said elevated position it is apparent that the water-containing compartment 16 has been sufficiently filled, and the pouring operation is then ceased, thereby avoiding overfilling and spillage with the consequent undesirable results hereinbefore described.

As mentioned, the function of the felt wick member 23 is to continuously transfer water from the lower compartment 16 to the plant 18 thereabove by capillary action, thereby ensuring that said plant is automatically continuously supplied with water in order to ensure the proper growth and health of said plant.

As water is consumed by the plant 18, as well as being dissipated to the atmosphere by evaporation, etc., the water level in the bottom compartment 16 is lowered, and the rod 28 and indicator 31, 31' descend therewith. When said indicator rod approaches its lowermost position it provides a visual sign that it is time to add water to the receptacle, thereby eliminating the necessity for manually feeling or merely looking at the condition of the earth in the receptacle in order to determine the moisture content thereof.

While in the preferred form of the invention it is an important feature to provide means for visually indicating when water should be replenished, it is to be understood that the invention has important utility whether or not the indicating means is employed, the principal feature of the invention being the provision of means for receiving water at the top of the pot and for channeling the water directly into the bottom water-holding receptacle so that all water is supplied to the plant through capillary action.

Summarizing the above, the invention comprises a receptacle having an upper, plant-containing section with a false bottom providing a separate water compartment therebelow, there being a wick projecting upwardly through said false bottom to automatically convey water upwardly from said water compartment to the plant by capillary action. In addition, the invention includes a tube-like channel member adjacent the container inner wall through which water can be introduced directly into said lower, water-containing compartment without overflowing or spillage. Unlike conventional plant receptacles which require a hole in the bottom thereof for water drainage, the present container does not include such a bottom hole or opening, thereby eliminating the necessity for placing the present receptacle in a dish or pan.

As mentioned, the present plant receptacle is preferably molded of an attractive, durable, and low-cost plastic, but the particular material utilized is not critical to the invention. Similarly, while a preferred form of the invention has been illustrated and described herein it is to be understood that the design or appearance of said receptacle, as well as the various components or elements thereof, can be varied without departing from the intended scope of the invention. In short, what is intended to be covered herein is not only the illustrated form of the present invention but also any and all variations or modifications thereof as may come within the spirit of said invention.

What I claim is:

1. In a plant container having an upper, plant-receiving compartment and a lower, water-containing compartment therebelow, and having a water-impervious divider separating said upper and lower compartments and a wick projecting upwardly through said divider for conveying water from said lower, water-containing compartment upwardly into said plant-receiving compartment by capillary action, the improvement comprising a channel member integrally joined to said divider at a peripheral location and extending upwardly therefrom at an angle which matches the angle of the adjacent side wall of said container, the outer side portion of said channel member being adjacent to the inner surface of said container along its entire length, said channel member including a pair of adjacent channels extending along the length of said channel members, each of said channels being open at its upper end and at its outer side and communicating at its lower end with the lower compartment and being closed on its outer side by the side wall of the container, one of said channels being dimensioned to receive water and convey the water from the upper end of the channel to said water-containing compartment, a float in said water-containing compartment and an elongated rod extending upwardly from said float through the other channel, said rod projecting above the upper end of said channel and being adapted at its upper end to provide a visual indication of the water level in said water-containing compartment.

2. The improvement defined in claim 1 wherein said divider and channel member are integrally molded of plastic, both of said channels being open on the side thereof adjacent to the inner surface of said container to facilitate molding and the inner surface of said container forming the other side of each of said channels in assembly.

3. The improvement defined in claim 2 and further comprising an upright knob integrally joined to the center of said divider for inserting and removing the same, and a hollow collar extending through said divider for receiving said wick.

* * * * *